(12) United States Patent
Ha et al.

(10) Patent No.: US 10,328,818 B2
(45) Date of Patent: Jun. 25, 2019

(54) SYSTEM AND METHOD FOR CHARGING BATTERY

(71) Applicant: Hyundai Motor Company, Seoul (KR)

(72) Inventors: Dong Gil Ha, Gyeonggi-do (KR); Woo Sung Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 269 days.

(21) Appl. No.: 15/358,660

(22) Filed: Nov. 22, 2016

(65) Prior Publication Data
US 2018/0079318 A1    Mar. 22, 2018

(30) Foreign Application Priority Data

Sep. 21, 2016  (KR) .................. 10-2016-0120829

(51) Int. Cl.
*B60L 11/18*     (2006.01)
*H02J 7/00*      (2006.01)

(52) U.S. Cl.
CPC ....... *B60L 11/1872* (2013.01); *B60L 11/1838* (2013.01); *B60L 11/1842* (2013.01); *B60L 11/1861* (2013.01); *H02J 7/007* (2013.01); *B60L 2240/545* (2013.01); *B60L 2240/547* (2013.01); *B60L 2240/549* (2013.01); *H02J 2007/0096* (2013.01); *Y02E 60/721* (2013.01); *Y02T 10/7005* (2013.01); *Y02T 10/705* (2013.01); *Y02T 10/7044* (2013.01); *Y02T 10/7072* (2013.01); *Y02T 90/121* (2013.01); *Y02T 90/128* (2013.01); *Y02T 90/14* (2013.01); (Continued)

(58) Field of Classification Search
CPC .............. B60L 11/1803; B60L 11/1838; B60L 11/1842; B60L 11/1861; B60L 11/1872; B60L 2240/545; B60L 2240/547; B60L 2240/549; H02J 7/007; H02J 2007/0096
USPC ........................................................ 307/9.1
See application file for complete search history.

(56) References Cited

U.S. PATENT DOCUMENTS 6,016,047 A *  1/2000  Notten ............... G01R 31/3651
                                                    320/128
6,624,615 B1 * 9/2003  Park ..................... B60L 3/0046
                                                    320/150
(Continued)

FOREIGN PATENT DOCUMENTS

JP    2008-098098 A    4/2008
JP    2011-015544      1/2011
(Continued)

*Primary Examiner* — Thienvu V Tran
*Assistant Examiner* — Brian K Baxter
(74) *Attorney, Agent, or Firm* — Mintz Levin Cohn Ferris Glovsky and Popeo, P.C.; Peter F. Corless

(57) ABSTRACT

A system for charging a battery is provided. The system includes a high voltage battery that supplies electrical energy necessary to assist in a motor during acceleration of a vehicle and stores electrical energy generated by a motor regeneration during declaration of the vehicle or occurrence of a margin output of an engine. An on board charger receive AC power from a power supply which is supplied from the outside and supplies power for charging the high voltage battery. A battery management system transmits and receives charging and discharging information regarding the high voltage battery to and from the power supply through the on board charger using controller area network (CAN) communication.

11 Claims, 2 Drawing Sheets

(52) U.S. Cl.
CPC .............. *Y02T 90/16* (2013.01); *Y02T 90/163* (2013.01); *Y04S 10/126* (2013.01)

(56) References Cited

U.S. PATENT DOCUMENTS

| | | | |
|---|---|---|---|
| 2006/0132089 A1* | 6/2006 | Ambrosio | H02J 7/0014 320/107 |
| 2007/0090844 A1* | 4/2007 | Klang | G01R 31/3648 324/426 |
| 2010/0121587 A1* | 5/2010 | Vian | G01R 31/3651 702/63 |
| 2010/0138177 A1* | 6/2010 | Yu | G01R 31/3651 702/63 |
| 2010/0164287 A1 | 7/2010 | Komazawa et al. | |
| 2011/0066309 A1* | 3/2011 | Matsuoka | B60L 11/1824 701/22 |
| 2011/0112781 A1* | 5/2011 | Anderson | G01R 31/3679 702/63 |
| 2011/0202192 A1 | 8/2011 | Kempton | |
| 2011/0202217 A1 | 8/2011 | Kempton | |
| 2011/0202418 A1 | 8/2011 | Kempton et al. | |
| 2013/0115485 A1* | 5/2013 | Christensen | H01M 4/382 429/50 |
| 2013/0188665 A1* | 7/2013 | Namou | B60L 11/18 374/45 |
| 2014/0174712 A1* | 6/2014 | Yang | H01M 10/625 165/287 |
| 2014/0361744 A1* | 12/2014 | Han | B60L 11/1824 320/109 |
| 2015/0054460 A1 | 2/2015 | Epstein et al. | |
| 2015/0077054 A1 | 3/2015 | Uyeki | |
| 2015/0100198 A1* | 4/2015 | Vian | G01R 31/3651 701/31.9 |
| 2015/0258909 A1* | 9/2015 | Kim | B60L 11/1861 701/36 |
| 2015/0270587 A1* | 9/2015 | Cho | H01M 10/63 701/22 |
| 2015/0283915 A1* | 10/2015 | Kim | B60L 11/1887 320/104 |
| 2015/0323603 A1* | 11/2015 | Kim | H01M 10/625 702/58 |
| 2015/0329003 A1 | 11/2015 | Li et al. | |
| 2016/0059716 A1 | 3/2016 | Gale et al. | |
| 2016/0099568 A1* | 4/2016 | Gersch | H02J 3/32 307/20 |
| 2017/0170533 A1* | 6/2017 | Choi | H01M 10/486 |
| 2017/0200994 A1* | 7/2017 | Kim | H01M 10/625 |
| 2017/0250548 A1* | 8/2017 | Eo | H02J 7/0029 |

FOREIGN PATENT DOCUMENTS

| | | |
|---|---|---|
| JP | 2011-239674 A | 11/2011 |
| JP | 2012-029491 A | 2/2012 |
| JP | 2012-095504 | 5/2012 |
| JP | 2015-186391 | 10/2015 |
| KR | 2013-0006453 A | 1/2013 |
| KR | 2013-0119808 A | 11/2013 |
| KR | 2016-0012355 A | 2/2016 |
| KR | 10-1631083 B1 | 6/2016 |

* cited by examiner

SYSTEM AND METHOD FOR CHARGING BATTERY

CROSS-REFERENCE TO RELATED APPLICATION

This application is based on and claims the benefit of priority to Korean Patent Application No. 10-2016-0120829, filed on Sep. 21, 2016 in the Korean Intellectual Property Office, the disclosure of which is incorporated herein in its entirety by reference.

TECHNICAL FIELD

The present disclosure relates to a system and method for charging a battery, and more particularly, to a technology of allowing a battery to be fully charged by increasing a temperature of the battery at a low temperature.

BACKGROUND

A vehicle using an internal combustion engine using gasoline or heavy oil as main fuel has negative impact on pollution such as air pollution, or the like. Therefore, to reduce the occurrence of the pollution, an electric vehicle or a hybrid vehicle which are operated by electrical energy output from a battery system have recently been developed. The battery system of the electric or hybrid vehicle may include a battery in which a plurality of battery cells are connected in series-parallel to store and provide energy.

In addition, since the plurality of battery cells repeatedly perform a charging and a discharging, the battery cells need to be managed to maintain an appropriate operation state and performance by efficiently adjusting the charging/discharging. Accordingly, a battery management device or a battery management system (BMS) configured to perform an algorithm for managing and operating the battery is provided. The BMS is configured to measure a current, a voltage, a temperature, and the like of the battery to estimate a state of charging (SOC) of the battery based on the measured current, voltage, and temperature, and controls the SOC to improve fuel consumption efficiency. To accurately control the SOC, the SOC of the battery performing the charging/discharging requires accurate estimation.

According to a method for estimating the SOC of the battery, the SOC of the battery is varied based on the temperature of the battery. In particular, there are problems that in a low temperature region or as the temperature of the battery is a low temperature, the SOC of the battery decreases to less than a target SOC of the battery, a drive distance of the vehicle is reduced due to a battery state which is not fully charged at the time of charging the battery, and a charging time of the battery is also increased.

SUMMARY

The present disclosure provides a system and method for charging a battery, and more particularly, provides a system and method for charging a battery capable of decreasing a charging time of the battery to allow the battery to be fully charged by increasing a temperature of the battery to solve problems such as a lack of a charging amount and an increased charging time at a low temperature of the battery used for an electric vehicle and a hybrid vehicle.

Other objects and advantages of the present disclosure may be appreciated by the following description and will be clearly described by the exemplary embodiments of the present disclosure. It will be easily known that the objects and advantages of the present disclosure can be implemented by means shown in the appended claims and a combination thereof.

According to an exemplary embodiment of the present disclosure, a system for charging a battery, the system may include: a high voltage battery configured to supply electrical energy necessary to assist in a motor during acceleration of a vehicle, and configured to store electrical energy generated by a motor regeneration during deceleration of the vehicle or when a margin output of an engine occurs; an on board charger configured to receive alternating current (AC) power from a power supply supplied from the outside, and supply power for charging the high voltage battery; and a battery management system configured to transmit and receive charging and discharging information of the high voltage battery to and from the power supply through the on board charger using controller area network (CAN) communication.

The charging and discharging information of the high voltage battery may include charging and discharging current instructions, discharging lower limit capacity, a discharging time, a discharging lower limit voltage, and a charging upper limit voltage of the high voltage battery. The battery management system may further be configured to initialize a discharging current instruction, discharging lower limit capacity, and a discharging time of the battery to supply energy to the power supply from the vehicle, and determine a state of the battery to update signals to be adapted for the purpose.

According to another exemplary embodiment of the present disclosure, a method for charging a battery may include: receiving, by a battery management system, a voltage and a current from an on board charger, and measuring a temperature of the battery and a state of charge (SOC) of the battery; initializing information of the battery; estimating a temperature increase amount of the battery at the time of charging the battery; calculating a charging prediction time Tc1 of the battery; determining whether the battery is able to be fully charged using the temperature increase amount of the battery; when the battery is not able to be fully charged, estimating a discharging amount SOC of the battery and a discharging time Td of the battery up to a temperature of the battery at which the battery is able to be fully charged using a battery temperature model; calculating a charging prediction time Tc2 of the battery after the discharging of the battery; and comparing the charging prediction time Tc1 of the battery with a value obtained by adding the discharging time Td of the battery up to the temperature of the battery at which the battery is able to be fully charged and the charging prediction time Tc2 of the battery.

The on board charger may be configured to receive voltage and current information of an external power source from a power supply using power line communication (PLC), and transmit the voltage and current information of the external power source to the battery management system via controller area network (CAN) communication. A temperature increase amount of the battery at the time of charging the battery may be estimated using a battery temperature increase table or a battery temperature model including a pre-tested result value based on the measured temperature of the battery, the measured SOC of the battery, and a voltage and a current of the on board charger.

In the calculation of the charging prediction time Tc1 of the battery, a temperature of the battery during a termination of the charging of the battery may be specified by adding the estimated temperature increase amount of the battery and a current temperature of the battery, and an SOC of the battery during the termination of the charging of the battery may be estimated from a charging amount table for each of temperatures of the battery, which is the pre-tested result value, to calculate the charging prediction time of the battery.

The determination of whether the battery is able to be fully charged may include terminating, by the battery management system, the charging of the battery after fully charging the battery, when the battery is able to be fully charged. In the estimation of the discharging amount SOC and the discharging time Td of the battery, the discharging amount SOC of the battery up to a temperature at which the battery is able to be fully charged may be estimated using a temperature increase table for each of discharging currents of the battery or a battery temperature model, which is a pre-tested result value, and a discharging time Td may be estimated from the estimated discharging amount SOC of the battery.

In the comparison of the charging prediction time Tc1 of the battery with the value obtained by adding the discharging time Td of the battery up to the temperature of the battery at which the battery is able to be fully charged and the charging prediction time Tc2 of the battery to each other, when the charging prediction time Tc1 of the battery is less than the value obtained by adding the discharging time Td of the battery up to the temperature of the battery at which the battery is able to be fully charged and the charging prediction time Tc2 of the battery to each other, a charging time and method of the battery in which the battery is able to be fully charged may be determined by repeatedly performing the calculation of the charging prediction time Tc1 of the battery to the calculation of the charging prediction time Tc2 of the battery after the discharging of the battery.

In the comparison of the charging prediction time Tc1 of the battery with the value obtained by adding the discharging time Td of the battery up to the temperature of the battery at which the battery is able to be fully charged and the charging prediction time Tc2 of the battery, when the charging prediction time Tc1 of the battery is greater than the value obtained by adding the discharging time Td of the battery up to the temperature of the battery at which the battery is able to be fully charged and the charging prediction time Tc2 of the battery, the battery management system may be configured to determine a charging time and method of the battery in which the battery is able to be fully charged in a current condition, and a discharging current instruction, discharging lower limit capacity, and a discharging time of the battery may be updated.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
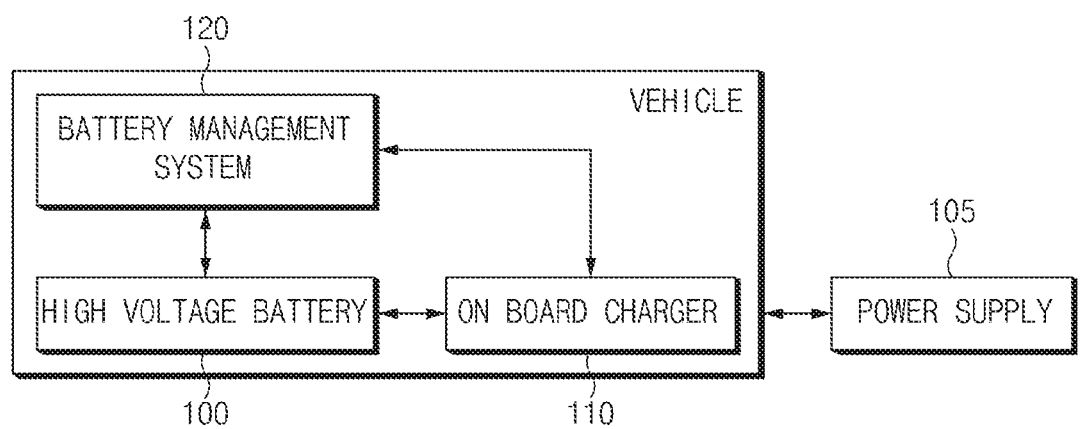
FIG. 1 is a configuration diagram of a system for charging a battery for charging the battery at a low temperature according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Advantages and features of the present disclosure and methods to achieve them will be set forth by exemplary embodiments described below in detail with reference to the accompanying drawings. However, the present disclosure is not limited to the exemplary embodiments set forth herein, but may be modified in many different forms. Merely, the exemplary embodiments of the present disclosure will be provided to describe the spirit of the present disclosure in detail so that those skilled in the art may easily implement the spirit of the present disclosure.

In the drawings, the exemplary embodiments of the present disclosure are not limited to illustrated specific forms, but are exaggerated for clarity. In the present specification, specific terms have been used, but are merely used for the purpose of describing the present disclosure and are not used for qualifying the meaning or limiting the scope of the present disclosure, which is disclosed in the appended claims. In the present specification, an expression 'connected to or coupled to' is used as a meaning including a case in which one component is directly connected to another component or is indirectly connected through another component. Unless explicitly described to the contrary, a singular form includes a plural form in the present specification.

Hereinafter, exemplary embodiments of the present disclosure will be described in detail with reference to the accompanying drawings. FIG. 1 is a configuration diagram of a system for charging a battery for charging the battery at a low temperature according to an exemplary embodiment of the present disclosure.

Referring to FIG. 1, the system for charging a battery included in a vehicle may exchange power source information, battery charging information, and battery discharging information of an on board charger 110 mounted within the system for charging a battery with a power supply 105 via power line communication (PLC). Particularly, the power supply 105 may be referred to as an electric vehicle supply equipment (EVSE), and may be referred to as a vehicle to grid (V2G) system.

The system for charging a battery may include the high voltage battery 100, the on board charger (OBC) 110 and a battery management system 120. In particular, the high voltage battery 100, the on board charger 110, and the battery management system 120 may be mounted within an electric vehicle. The high voltage battery 100 may be configured to supply electrical energy necessary to assist in a motor during acceleration of the vehicle (e.g., engagement of accelerator pedal), and may be configured to store electrical energy generated by a motor regeneration during deceleration of the vehicle (e.g., engagement of a brake pedal) or occurrence of a margin output of an engine. The high voltage battery 100 may include a controller area network (CAN) communicator, and may be configured to transmit and receive a signal with the on board charger 110 via the CAN communicator, and the on board charger 110 may be configured to transmit and receive the signal with the battery management system 120.

Further, the on board charger 110 may be configured to receive alternating current (AC) power from the power supply supplied from the outside, and supply power for charging to the high voltage battery 100, and the on board charger 110 may be configured to transmit and receive charging and discharging information regarding the battery to and from the power supply 105 via the PLC. The battery management system 120 may be configured to transmit and receive the charging and discharging information regarding the battery such as charging and discharging current instructions of the battery, discharging lower limit capacity (e.g., discharging lower limit SOC), a discharging time, a discharging lower limit voltage, a charging upper limit voltage, and the like, to and from the on board charger 110 via the CAN communication.

Figure 2:
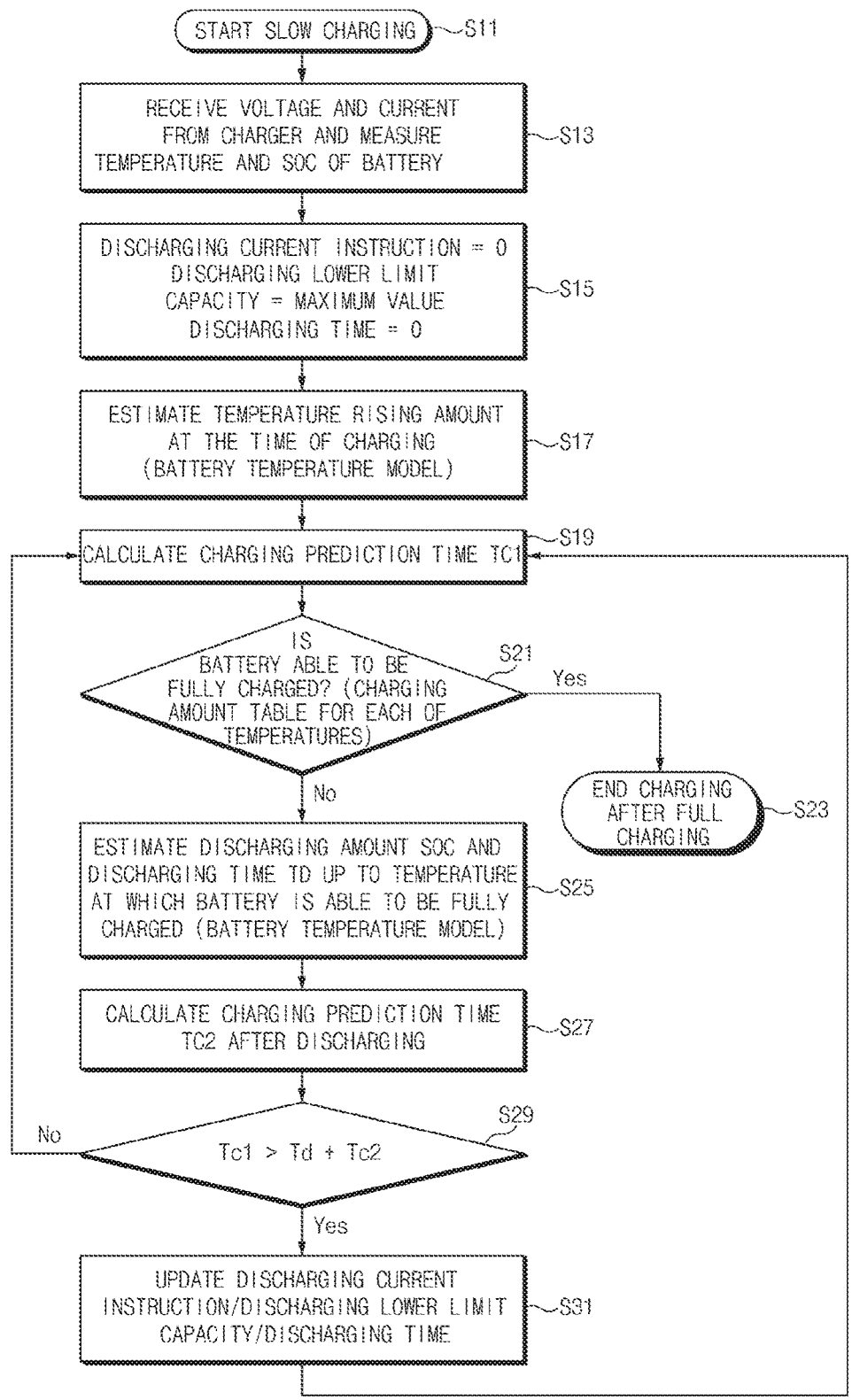
FIG. 2 is a diagram illustrating a method for charging a battery at a low temperature according to an exemplary embodiment of the present disclosure.

FIG. 2 is a diagram illustrating a method for charging a battery at a low temperature according to an exemplary embodiment of the present disclosure. Referring to FIG. 2, the on board charger of the system for charging a battery may be configured to initiate slow charging of the battery (S11).

In other words, when a user connects a slow charging connector to the vehicle to charge the battery of the vehicle, the on board charger may be configured to initiate a slow charging sequence.

Further, the battery management system may be configured to receive a voltage and a current from the on board charger, and measure a temperature of the battery and an SOC of the battery (S13). In other words, the battery management system may be configured to receive a voltage and current (e.g., a charging voltage and a charging current) of a chargeable external power source from the on board charger to estimate a battery charging prediction time from a current condition of the system for charging a battery, and measure a current temperature of the battery and a current SOC of the battery. In particular, the on board charger may be configured to receive voltage and current information regarding the external power source from the power supply via the PLC, and transmit the voltage and current information regarding the external power source to the battery management system via the CAN communication.

The battery management system may then be configured to initialize or output battery information (S15). In other words, the battery management system may be configured to initialize the discharging current instruction, the discharging lower limit capacity (the discharging lower limit SOC), and the discharging time of the battery, which are appointed signals, to supply energy to the power supply from the vehicle as required in the vehicle to grid (V2G) system, and determine a state of the battery (e.g., SOC) to update the signals. The battery management system may further be configured to initialize the discharging current instruction and the discharging time to a value of 0, and initialize the discharging lower limit capacity to a maximum value by the initialization.

Additionally, the battery management system may be configured to estimate a temperature increase amount of the battery during the charging of the battery (S17). Specifically, the battery management system may be configured to estimate the temperature increase amount of the battery during the charging of the battery using a battery temperature increase table or a battery temperature model including pre-tested result values based on the current measured temperature of the battery, the SOC of the battery, and the charging voltage and current of the on board charger. In particular, since the battery temperature increase table or the battery temperature model is a table or modeling method including the pre-tested result values, a detailed description thereof will be omitted.

Further, the battery management system may be configured to calculate a charging prediction time Tc1 of the battery (S19). Specifically, a temperature of the battery during the termination of the charging of the battery may be determined by adding the temperature increase amount of the battery estimated in S17 and the current temperature of the battery, and the SOC of the battery during the termination of the charging of the battery may be estimated from a charging amount table for each of temperatures of the battery, which are the pre-tested result values, to calculate the charging prediction time of the battery. The charging prediction time of the battery may be calculated using the following Equation 1 from the SOC of the battery during the termination of the charging of the battery, the current SOC of the battery, the battery capacity, and the charging current $$\text{Charging Prediction Time}(Tc1) = \qquad \text{Equation 1}$$

$$\frac{\left(\begin{array}{c}SOC \text{ of Battery at the Time} \\ \text{of Ending Charging} \\ \text{Current } SOC \text{ of Battery}\end{array} - \right) \times \text{Battery Capacity}}{(\text{Charging Current})}$$

The battery management system may then be configured to determine whether the battery may be fully charged using the temperature increase amount of the battery (S21). Particularly, the battery management system may use the charging amount table for each of the temperatures of the battery as a method for determining whether the battery may be fully charged. When the battery is determined to be capable of being fully charged, the battery management system may be configured to fully charge the battery and then terminate the charging of the battery (S23).

When the battery is not capable of being fully charged, the battery management system may be configured to estimate a discharging amount SOC and a discharging time Td of the battery up to a temperature of the battery at which the battery may be fully charged using the battery temperature model (S25). Specifically, the battery management system may be configured to estimate the discharging amount SOC of the battery up to the temperature at which the battery may be fully charged using the temperature increase table for each of discharge currents of the battery or the battery temperature model, which is the pre-test result value, and may be configured to estimate the discharging time Td using the following Equation 2 from the current SOC of the battery, the discharging amount SOC of the battery, the battery capacity, and the discharging current $$\text{Discharging Time}(Td) = \qquad \text{Equation 2}$$

$$\frac{\left(\begin{array}{c}\text{Current } SOC \text{ of Battery} - \\ SOC \text{ of Battery After Discharging of Battery}\end{array}\right) \times \text{Battery Capacity}}{\text{Discharging Current}}$$

Furthermore, the battery management system may be configured to calculate a temperature increase amount after the discharging of the battery and a charging prediction time Tc2 of the battery based on the SOC of the battery using the following Equation 3 from an SOC of a fully charged battery, the discharging amount SOC of the battery, the battery capacity, and the charging current (S27).

$$\text{Charging Prediction Time}(Tc2) = \qquad \text{Equation 3}$$

$$\frac{\left(\begin{array}{c}SOC \text{ of Fully Charged Battery} - \\ \text{Discharging } SOC \text{ of Battery}\end{array}\right) \times \text{Battery Capacity}}{\text{Charging Current}}$$

The battery management system may then be configured to compare the charging prediction time Tc1 of the battery with a value obtained by adding the discharging time Td of the battery up to the temperature of the battery at which the battery may be fully charged to the charging prediction time Tc2 of the battery (S29). In particular, when the charging prediction time Tc1 of the battery is less than the value obtained by adding the discharging time Td of the battery up to the temperature of the battery at which the battery may be fully charged to the charging prediction time Tc2 of the battery, an optimal battery charging time and method capable of fully charging the battery may be determined every sampling period by repeating S19 to S27.

In addition, when the charging prediction time Tc1 of the battery is greater than the value obtained by adding the discharging time Td of the battery up to the temperature of the battery at which the battery may be fully charged to the charging prediction time Tc2 of the battery, the battery management system may regard such a result as the optimal battery charging time and method capable of fully charging the battery may be determined in the current condition, and thus may be configured to update the discharging current instruction, the discharging lower limit capacity, and the discharging time of the battery to supply energy to the power supply from the vehicle, thereby guiding the battery to be discharged (S31). Particularly, the discharging current instruction, the discharging lower limit capacity, and the discharging time use the value calculated in S25, and since the optimal charging time and method may be changed based on an external environment of the vehicle or a state of the V2G system, the calculated value may be updated or maintained by repeating S19 to S31 every sampling time.

Meanwhile, the method according to the present disclosure as described above may be created by a computer program. Codes and code segments configuring the computer program may be easily deduced by computer programmers in the art. In addition, the created program may be stored in a non-transitory computer readable recording medium (information storage medium) and read and executed by computers, thereby implementing the method according to the present disclosure. In addition, the recording medium includes all types of computer readable recording media.

As described above, according to the exemplary embodiments of the present disclosure, the present technology is a technology of allowing the battery to be fully charged by increasing the temperature of the battery using the charging and the discharging between a power supply and the vehicle. Further, the present technology is a technology capable of solving the problems such as the lack of the charging amount of the battery and the increased charging time of the battery at the low temperature. The present technology is also capable of decreasing battery equipment costs since a temperature increase system such as a heater included in the battery may be omitted, thus reducing charging costs for increasing the temperature of the battery.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A system for charging a battery, comprising:
a high voltage battery configured to supply electrical energy necessary to assist in a motor during acceleration of a vehicle, and configured to store electrical energy generated by a motor regeneration during deceleration of the vehicle or occurrence of a margin output of an engine;

an on board charger configured to receive alternating current (AC) power from a power supply supplied from the outside, and supply power for charging the high voltage battery; and a battery management system configured to transmit and receive charging and discharging information regarding the high voltage battery to and from the power supply through the on board charger using controller area network (CAN) communication, wherein the battery management system is further configured to:

estimate a temperature increase amount of the battery during charging of the battery;

calculate a charging prediction time of the battery;

determine whether the battery is able to be fully charged using the temperature increase amount of the battery;

when the battery is not able to be fully charged, estimate a discharging amount state of charge (SOC) of the battery and a discharging time of the battery up to a temperature of the battery at which the battery is able to be fully charged using a battery temperature model;

calculate a charging prediction time of the battery using the battery SOC at full charge, the discharge SOC of the battery, the charge current and the battery capacity after the discharging of the battery; and compare the charging prediction time of the battery with a value obtained by adding the discharging time up to the temperature of the battery at which the battery is able to be fully charged and the charging prediction time of the battery.

2. The system for charging a battery according to claim 1, wherein the charging and discharging information regarding the high voltage battery includes charging and discharging current instructions, discharging lower limit capacity, a discharging time, a discharging lower limit voltage, and a charging upper limit voltage of the high voltage battery.

3. The system for charging a battery according to claim 1, wherein the battery management system is configured to initialize a discharging current instruction, discharging lower limit capacity, and a discharging time of the battery to supply energy to the power supply from the vehicle, and determine a state of the battery to update signals.

4. A method for charging a battery, the method comprising:

receiving, by a battery management system (BMS), a voltage and a current from an on board charger, and measuring a temperature of the battery and a state of charge (SOC) of the battery;

initializing, by the BMS, information of the battery;

estimating, by a controller, a temperature increase amount of the battery during charging of the battery;

calculating, by the controller, a charging prediction time of the battery;

determining, by the controller, whether the battery is able to be fully charged using the temperature increase amount of the battery;

when the battery is not able to be fully charged, estimating, by the controller, a discharging amount SOC of the battery and a discharging time of the battery up to a temperature of the battery at which the battery is able to be fully charged using a battery temperature model;

calculating, by the controller, a charging prediction time of the battery using the battery SOC at full charge, the discharge SOC of the battery, the charge current and the battery capacity after the discharging of the battery; and comparing, by the controller, the charging prediction time of the battery with a value obtained by adding the discharging time up to the temperature of the battery at which the battery is able to be fully charged and the charging prediction time of the battery.

5. The method for charging a battery according to claim 4, wherein the on board charger is configured to receive voltage and current information regarding an external power source from a power supply using power line communication (PLC), and transmit the voltage and current information regarding the external power source to the battery management system using controller area network (CAN) communication.

6. The method for charging a battery according to claim 4, wherein a temperature increase amount of the battery during charging of the battery is estimated using a battery temperature increase table or a battery temperature model including a pre-tested result value based on the measured temperature of the battery, the measured SOC of the battery, and a voltage and a current of the on board charger.

7. The method for charging a battery according to claim 4, wherein in the calculating of the charging prediction time of the battery, a temperature of the battery at the termination of the charging of the battery is determined by adding the estimated temperature increase amount of the battery and a current temperature of the battery, and an SOC of the battery at the termination of the charging of the battery is estimated from a charging amount table for each of temperatures of the battery, which is the pre-tested result value, to calculate the charging prediction time of the battery.

8. The method for charging a battery according to claim 4, wherein the determination of whether the battery is able to be fully charged includes:

terminating, by the battery management system, the charging of the battery after fully charging the battery, when the battery is able to be fully charged.

9. The method for charging a battery according to claim 4, wherein in the estimation of the discharging amount SOC and the discharging time of the battery, the discharging amount SOC of the battery up to a temperature at which the battery is able to be fully charged is estimated using a temperature increase table for each of discharging currents of the battery or a battery temperature model, which is a pre-tested result value, and a discharging time is estimated from the estimated discharging amount SOC of the battery.

10. The method for charging a battery according to claim 4, wherein in the comparison of the charging prediction time of the battery with the value obtained by adding the discharging time of the battery up to the temperature of the battery at which the battery is able to be fully charged and the charging prediction time of the battery:

when the charging prediction time of the battery is less than the value obtained by adding the discharging time of the battery up to the temperature of the battery at which the battery is able to be fully charged and the charging prediction time of the battery, a charging time and method of the battery in which the battery is able to be fully charged are determined by repeatedly performing the calculating of the charging prediction time of the battery to the calculating of the charging prediction time of the battery after the discharging of the battery.

11. The method for charging a battery according to claim 4, wherein in the comparison of the charging prediction time of the battery with the value obtained by adding the discharging time of the battery up to the temperature of the battery at which the battery is able to be fully charged and the charging prediction time of the battery:

when the charging prediction time of the battery is greater than the value obtained by adding the discharging time of the battery up to the temperature of the battery at which the battery is able to be fully charged and the charging prediction time of the battery, the battery management system is configured to determine a charging time and method of the battery in which the battery is able to be fully charged in a current condition, and a discharging current instruction, discharging lower limit capacity, and a discharging time of the battery are updated.

* * * * *